United States Patent
Harrington et al.

[15] 3,643,587
[45] Feb. 22, 1972

[54] SMOKING MACHINE

[72] Inventors: Herbert A. Harrington; William M. Allen, both of Cincinnati; William C. Kuhn, West Chester, all of Ohio

[73] Assignee: Beatrice Foods Company, Chicago, Ill.

[22] Filed: Nov. 10, 1969

[21] Appl. No.: 875,083

[52] U.S. Cl. .................................................99/261
[51] Int. Cl. ................................................A23b 1/04
[58] Field of Search..................99/259, 260, 261, 229, 234; 107/55, 57; 126/59.5; 128/193, 194; 239/338

[56] References Cited

UNITED STATES PATENTS

| | | | |
|---|---|---|---|
| 2,397,726 | 4/1946 | Cook | 107/57 D |
| 2,585,799 | 2/1952 | Lawrence | 99/261 |
| 3,106,884 | 10/1963 | Dalve et al. | 99/261 |
| 3,125,017 | 3/1964 | Tauber et al. | 99/261 X |
| 3,249,553 | 5/1965 | Steinberg | 239/338 X |
| 3,255,689 | 6/1966 | Kielsmeier et al. | 99/234 R |
| 3,353,477 | 11/1967 | Wilhelm et al. | 99/360 |
| 3,503,760 | 3/1970 | Allen | 99/229 |

*Primary Examiner*—Billy J. Wilhite
*Assistant Examiner*—Arthur O. Henderson
*Attorney*—Hume, Clement, Hume & Lee, Ltd.

[57] ABSTRACT

Apparatus for rapidly imparting a smokey flavor to a quantity of comestible products by moving a stream of said products through a smoke chamber wherein said products are exposed to nebulized liquid smoke.

9 Claims, 8 Drawing Figures

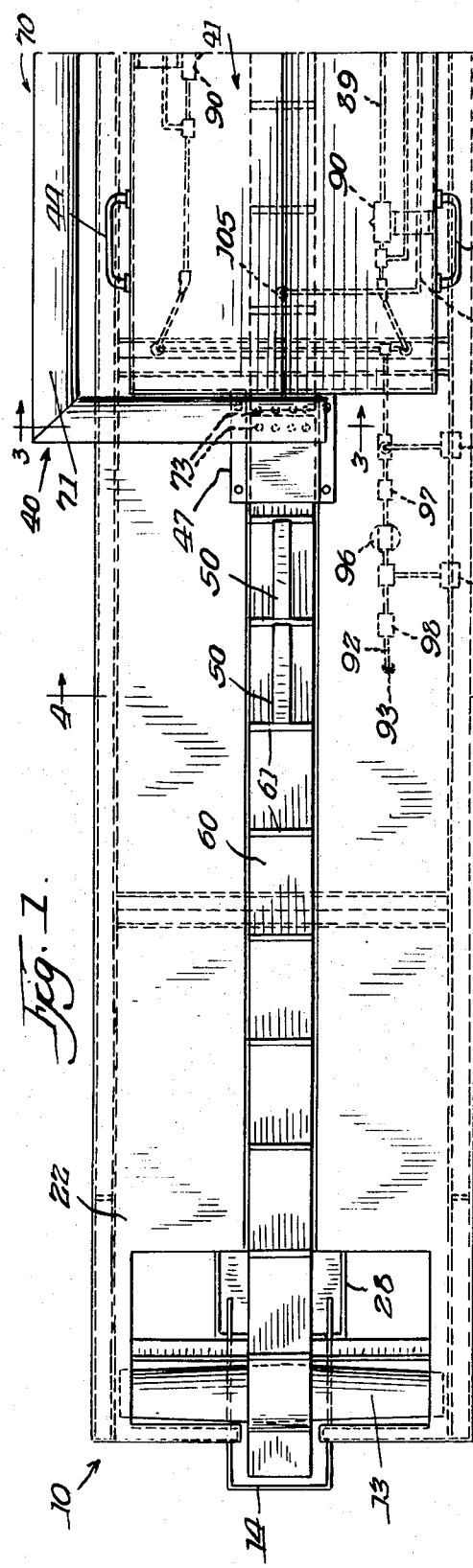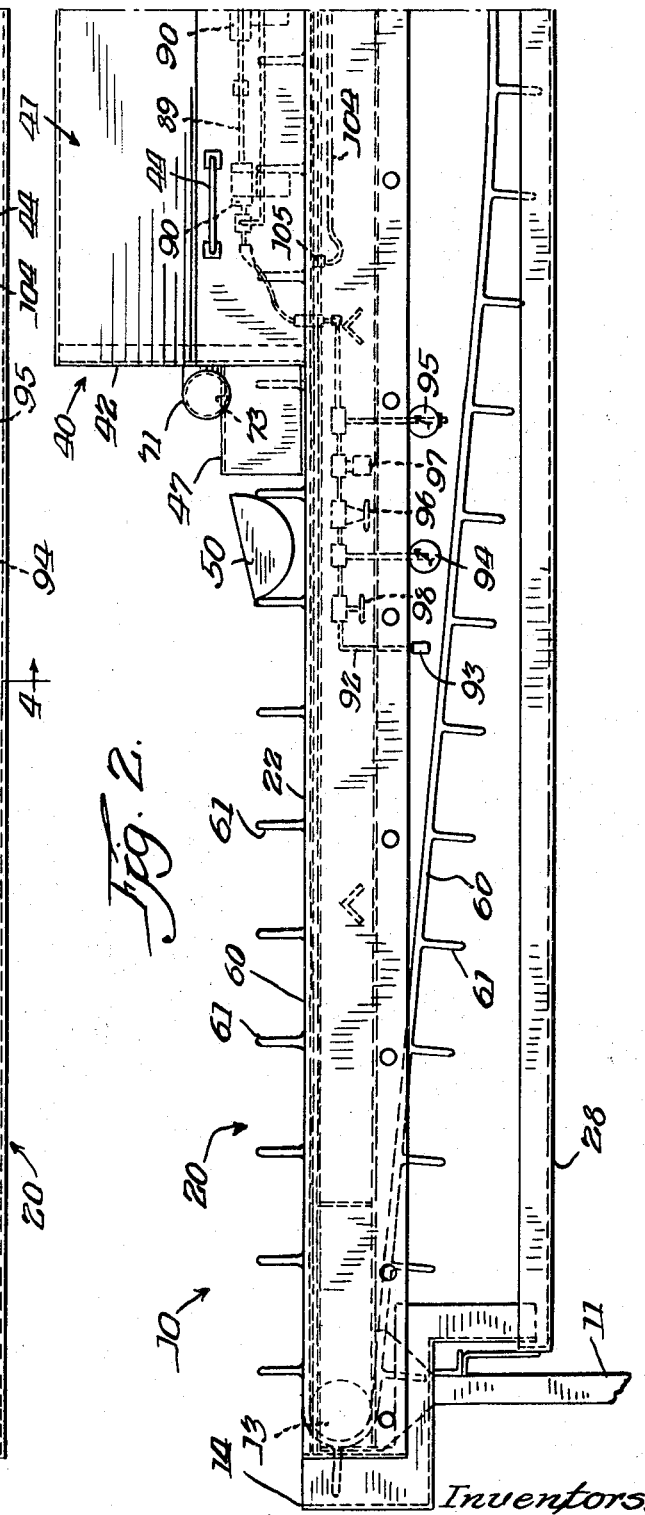

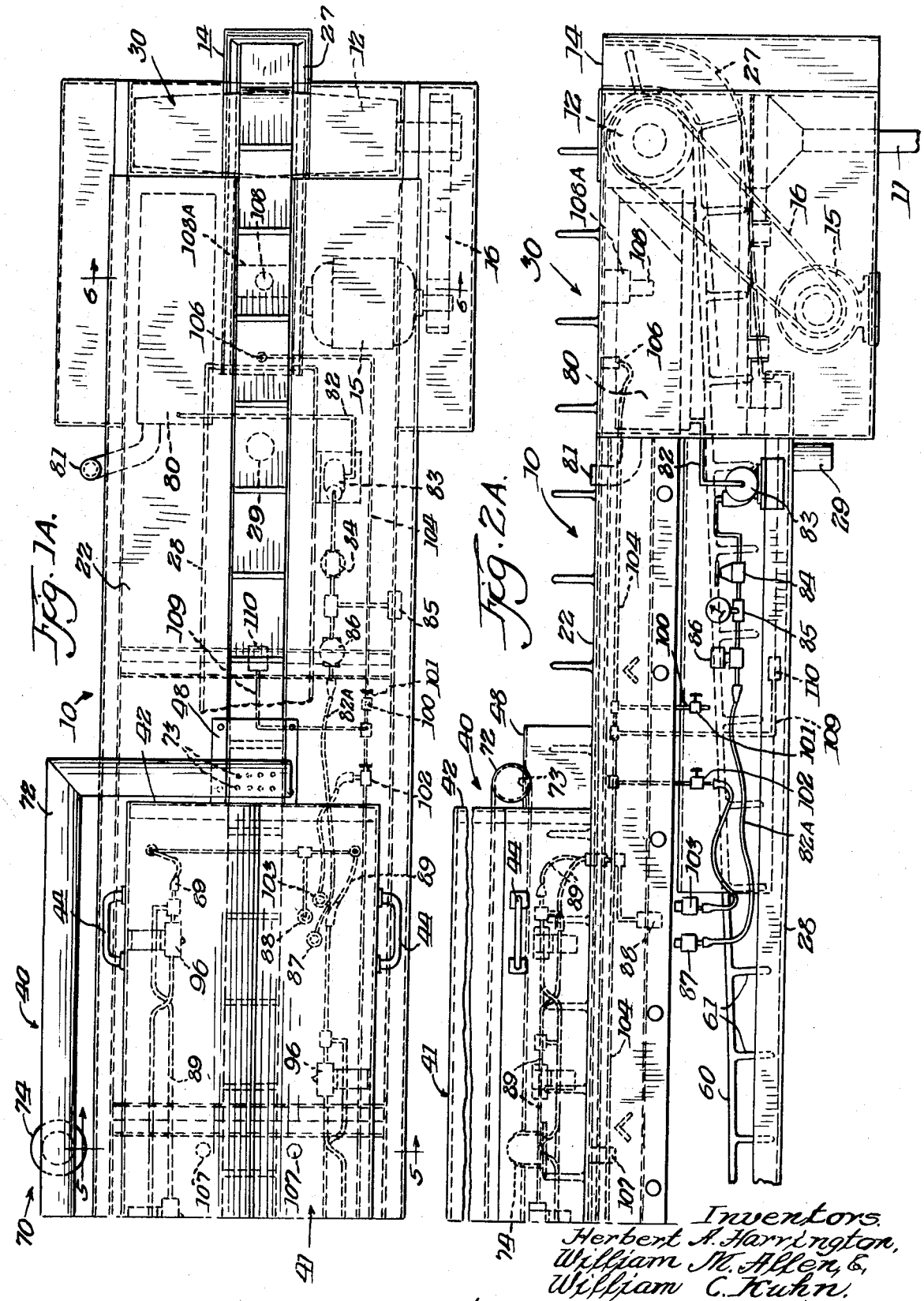

Inventors.
Herbert A. Harrington,
William M. Allen, &
William C. Kuhn.
By Hume, Clement, Hume, & Lee
Attys.

SMOKING MACHINE

BACKGROUND AND GENERAL DESCRIPTION

This invention relates generally to apparatus for smoking comestible products and more particularly relates to an apparatus for rapidly imparting a smokey flavor to large quantities of comestibles with nebulized liquid smoke.

An effective method of imparting a smokey flavor to foods, such as meat, fish, cheeses, poultry, potato chips and corn chips, etc., is described fully in U.S. Pat. No. 3,503,760, issued Mar. 31, 1970 to William M. Allen and assigned to the same assignee as this application. As explained therein, the process of smoking foods by exposure to nebulized liquid smoke has the advantages, among others, of substantially reducing capital and labor costs; enhancing the quality of the smoked food; and permitting the smokiness of the food to be accurately and reproducibly controlled.

As further explained in the above-noted Allen patent, "liquid smoke" is a liquid medium capable of imparting a smokey taste to an exposed food product. The liquid smoke is preferably a solution of natural woodsmoke flavors captured in a liquid medium, but can be either a wood distillate or a synthetic liquid smoke. Additionally, as explained in said Allen patent, the liquid smoke is nebulized by reducing or dispersing the liquid into a fine mist or vapor, such as through an aerosolizing nozzle, so that the resulting droplet size is less than about 150 microns, and preferably between 10 and 50 microns.

An object of this invention is to provide apparatus capable of smoking foods rapidly by utilizing nebulized liquid smoke, such as in the manner described in said Allen patent.

More specifically, this invention provides a continuous-flow apparatus that is capable of imparting a smokey flavor to large quantities of food products by exposing a product stream to a moving, turbulent cloud of nebulized liquid smoke under controlled conditions. In the preferred form, the apparatus includes means to expose the product stream to the turbulent liquid smoke cloud as soon as the cloud is generated by arranging the apparatus to expose the products to the liquid smoke as soon as or shortly after the liquid smoke is nebulized. Further, means are provided to induce turbulence in the resulting nebulized liquid smoke cloud to assure that essentially all product surfaces are uniformly exposed to the nebulized liquid smoke.

The apparatus of this invention rapidly smokes food products, such as meats, fish, cheeses, etc., in mass production quantities, and can be readily adjusted to smoke different forms of food products. The apparatus furthermore includes exhaust means for minimizing the escape of liquid smoke into the adjacent atmosphere to assure a favorable working environment, and means for preventing the deleterious accumulation of condensed liquid smoke and food debris in the apparatus.

Further objects and advantages of the apparatus in accordance with this invention will become apparent from the following description of an exemplary embodiment thereof adapted for smoking cheese slices on a rapid, mass-production basis. In the accompanying drawings:

FIG. 1 is a top plan view of the left portion of a smoking machine embodying the features and advantages of this invention;

FIG. 1A is the top plan view of the right portion of the smoking machine illustrated in FIG. 1;

FIG. 2 is a side elevational view of the left portion of the smoking machine as illustrated in FIG. 1;

FIG. 2A is a side elevational view of the right portion of the smoking machine, as illustrated in FIG. 1A;

EXEMPLARY EMBODIMENT

Figure 3:
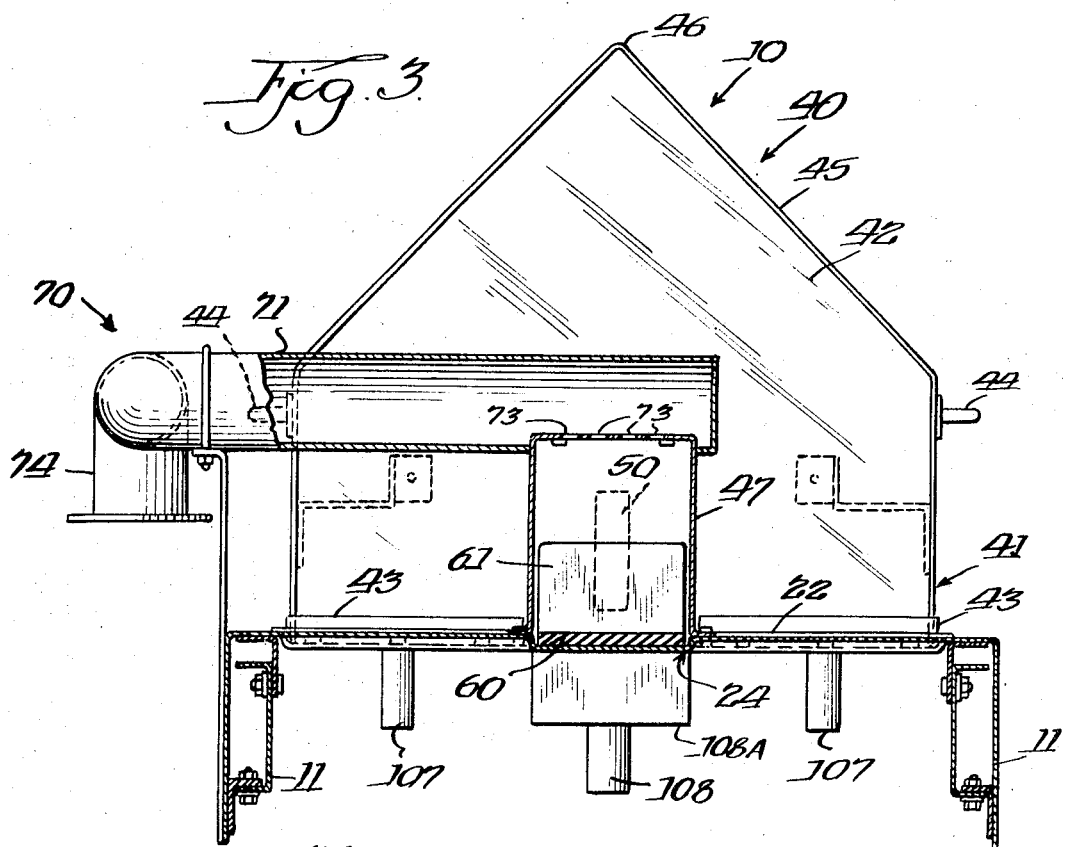
FIG. 3 is a cross-sectional view of the smoking machine taken along the line 3—3 in FIG. 1.

The smoking machine illustrated in the accompanying drawings is generally indicated by the reference numeral 10. Generally, the machine 10 comprises a continuous-flow conveyor system having a product loading or receiving station 20, a downstream product discharge station 30, and an intermediate smoke station 40. The machine 10 is adapted to be placed in line with other food-treating equipment in a production facility, such as a cheese factory or the like, so that it can be operated to smoke the food product as an integral step in the mass production of the food.

For example, the loading station 20 of the machine 10 can be placed adjacent a cheese-cutting station where, in the typical cheese factory, longhorns of cheese are cut down into approximately 7-ounce slices. As illustrated schematically by the cheese slices 50 in FIGS. 1 and 2, the slices then can be placed onto the machine 10 at the loading station 20, from either side of the machine 10, to define a continuous food product stream on the machine. The operation of the machine 10 will thereby move the food product stream along a selected path of travel through the smoke station 40, where the desired smokey flavor will be imparted to the food before the food reaches the discharge station 30. The discharge station 30 of the machine 10 can be arranged adjacent a treatment station, such as a wrapping table or the like, so that the smoked cheese or other food product can be wrapped in preparation of storage and shipment.

Referring to the drawings in more detail, the machine 10 includes a continuous conveyor belt 60 which is adapted to receive the food product and carry the product through the successive stations of the machine. More particularly, the belt 60 is adapted to support the comestible product being smoked in a product stream in a manner which leaves the major portion of the product surface exposed for contact by the nebulized smoke at the smoke station 40. In the illustrated embodiment, a plurality of uniformly spaced vertical flights 61 are provided on the belt 60 to adapt the machine 10 to receive the cheese slices 50. The vertical height of the flights 61 is selected to suspend the cheese slices 50 above the base portion of the belt 60 so that essentially all surfaces of the cheese slices are exposed. Of course, the composition and configuration of the belt 60 can be modified, or the belt 60 replaced by a vibrating conveyor or the like, to adapt the machine for smoking food products other than cheese slices.

The machine 10 also includes structure for supporting the conveyor belt 60 and driving the belt along a desired path of travel at a selected speed. In this regard, the belt 60 is supported on a frame 11 between a driven pulley 12 and an idler pulley 13. Extensions 14 on the frame 11 are provided next to the pulleys 12 and 13 to protect the flights 61 of the belt 60 during operation of the machine 10. As seen in FIGS. 1A and 2A, a suitable variable speed drive motor 15 is connected to the driven pulley 12, such as by a V-belt 16. The motor 15 is remotely controlled by conventional control means (not shown) to set or selectively vary the speed of travel of the belt 60 and thereby vary the residence time for the products at the smoke station 40.

The supporting frame 11 of the machine 10 further includes a slide table 22 along which the conveyor belt 60 slides between the machine operating stations. The slide table 22 is elongate in configuration and extends for the full length of the machine 10 to provide a working surface for loading and discharging the comestible products from either side of the machine. The table 22 is preferably formed from a corrosion-resistant metal, such as stainless steel, since it is continuously exposed to the food products and the liquid smoke during the operation of the machine 10.

Figure 4:
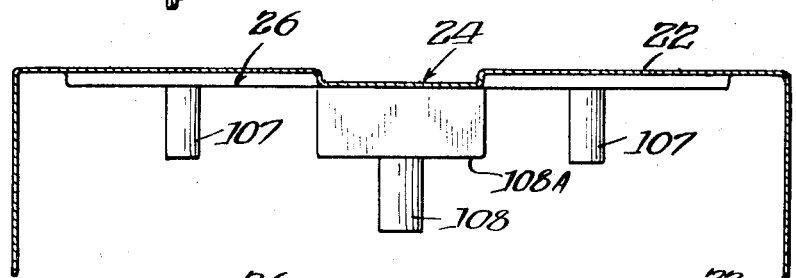
FIG. 4 is a cross-sectional view of the conveyor slide table incorporated in the machine, as viewed along the line 4—4 in FIG. 1.
Figure 5:
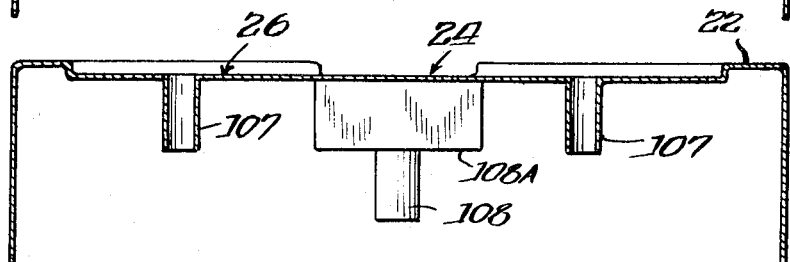
FIG. 5 is a cross-sectional view of the conveyor slide table, as viewed along the line 5—5 in FIG. 1A.
Figure 6:
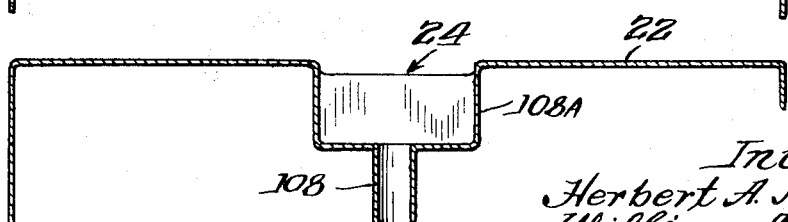
FIG. 6 is a cross-sectional view of the conveyor slide table, as viewed along the line 6—6 in FIG. 1A.

As clearly shown in FIGS. 4—6, the portions of the slide table 22 adjacent the loading station 20 and the discharge station 30 are provided with a longitudinal central channel 24.

The channel 24 is recessed below the top surface of the table 22 and is dimensioned to receive the conveyor belt 60 with a relatively close tolerance. The belt 60 is arranged on the adjustable pulleys 12 and 13 to be driven along the channels 24. The channels 24 can thereby function to contain flushing water and to collect any liquid smoke residue or other debris which accumulates on the slide table 22 during the smoking operation.

As shown in FIGS. 3 and 5, the slide table 22 is also formed to define a recess 26 adjacent the smoke station 40. The recess 26 is the same depth as the channels 24 and is aligned with the channels 24 so that the belt 60 slides freely through the central portion of the smoke station 40 on the table 22. The recess 26 is further formed with a substantial transverse extent so it will collect and accumulate the liquid smoke condensate and other residue which is produced during the operation of the smoke station 40.

The frame structure 11 also includes an elongate drip pan 28 extending longitudinally beneath the belt 60. The drip pan 28 is provided to collect and accumulate the liquid smoke, bits of food product, or other debris that is carried by the adjacent returning portion of the belt 60. A formed channel 27 is also provided below the return portion of the belt 60 to collect the excess fluid and food particles from the belt 60 and direct them to the pan 28.

The smoke station 40 on the machine 10 includes a housing 41 which is preferably formed from a fluid-impervious and corrosion-resistant material such as stainless steel. The housing 41 is generally parallel to the belt 60 and is provided with a selected length. As shown in FIG. 3, end walls 42 on the housing 41, constructed from a suitable material such as plexiglass or stainless steel, are provided so that the housing enclosure defines a substantially closed smoke chamber in the path of travel of the belt 60 in which a portion of the product stream can reside temporarily during the operation of the machine 10.

Further, the housing 41 is placed within the central recess 26 provided in the top of the conveyor slide table 22 and is sealed with respect to the table 22 by sealing tape 43 or other suitable gasketing material. Handles 44 are provided to remove the housing 41 from the table 22 for cleaning and inspecting the smoking apparatus contained within the housing.

As clearly illustrated in FIG. 3, the housing 41 is centered in alignment with the path of travel of the conveyor 60. Since the interior surfaces of the housing 41 will act as collectors for liquid smoke condensate during the operation of the machine 10, the preferred form of the housing 41 includes a roof structure 45, above the conveyor 60, which will conduct the condensate transversely so as to prevent the discharge of the condensate onto the food product stream on the conveyor. In the illustrated embodiment, this function is accomplished by providing the roof structure 45 with a peaked configuration, having a peak 46 substantially aligned with the longitudinal centerline of the conveyor 60. The slope of the roof structure 45 thus directs any condensate collected on the interior surfaces of the roof 45 transversely away from the product stream on the conveyor 60.

The housing 41 also includes inlet and outlet tunnels 47 and 48, respectively, for directing the conveyor 60 through the smoke station 40. The tunnels are joined to the adjacent end wall 42 in a fluidtight manner and are dimensioned to have substantially the same width as the conveyor channel 24. In fact, as seen in FIG. 3, the cross section of the tunnels 47 and 48 preferably is coordinated with the dimensions of the conveyor flights 61 and the size of the treated food product, such as the cheese slice 50, so that the communication between the atmosphere and the interior of the housing 41 through the tunnels is minimized. This arrangement reduces the dilution of the liquid smoke in the housing 41 caused by the entrance of air through the tunnels 47 and 48. In the illustrated embodiment, for instance, the vertical height of the tunnels 47 and 48 is correlated with the height of the flights 61 so that the cheese slices 50 pass through the tunnels with minimum vertical clearance. Similarly, the horizontal spacing of the belt flights 61 and the length of the tunnels 47 and 48 are correlated so that at least one flight 61 is in each tunnel during the operation of the machine. The flights 61 will thereby operate to seal the major portion of each of the tunnels 47 and 48.

The smoke station 40 further includes an exhaust system 70 for removing the atomizing medium and infiltration air from the housing 41 during the operation of the machine 10. The system 70 includes a pair of exhaust ducts 71 and 72 which are joined, respectively to the inlet and outlet tunnels 47 and 48. Exhaust openings 73 in the top portion of each tunnel 47 and 48 place the ducts 71 and 72 in fluid communication with the interior of each tunnel.

The ducts 71 and 72 are joined together by a common outlet duct 74, as shown in FIG. 3. The duct 74 in turn is connected to a suitable suction fan (not shown) which draws accumulated gases from the housing 41 and, in the preferred embodiment, simultaneously creates a slight partial vacuum within the housing. The exhaust gas is sent through filtering equipment or the like to remove the noxious odors and then can be conveyed to a suitable stack for discharge into the atmosphere. Alternatively, the exhaust system 70 can be provided with condensing means (not shown) which would retrieve the liquid smoke from the exhaust gases for recirculation in the machine 10.

The continuous operation of the exhaust system 70 thereby withdraws the accumulated gases from the housing 41 and creates a negative pressure in the housing. The resulting pressure differential causes the surrounding air to be drawn inward into the housing 41 through the tunnels 47 and 48, and thereby prevents the escape of the liquid smoke cloud from the housing during operation of the machine 10. Furthermore, the connection of the exhaust ducts 71 and 72 to the tunnels 47 and 48 causes the exhaust system 70 first to withdraw the air flowing into the housing through the tunnels, before the liquid smoke in the housing is withdrawn. This location of the exhaust ducts 71 and 72 thereby reduces the loss of nebulizing liquid smoke from the housing 41 and, permits the cloud of liquid smoke in the housing to become concentrated, during the operation of the machine 10.

The machine 10 furthermore includes a liquid smoke supply system for providing a continuous supply of liquid smoke to the smoke station 40. In this regard, a liquid smoke reservoir 80 is mounted at the discharge end 30 of the machine 10. A filler pipe 81 allows the supply of liquid smoke in the reservoir 80 to be replenished as required, and a liquid smoke feed line 82 is provided to direct the liquid from the reservoir 80. Suitable means, such as the centrifugal pump 83, is provided to discharge the liquid smoke from the reservoir 80 and direct the liquid toward the smoke station 40. As seen in FIGS. 1A and 2A, a throttling valve 84 is provided in the liquid smoke line 82 downstream from the pump 83 to regulate the pressure of the liquid smoke. Further, a pressure gauge 85 is placed in the line to provide a visual indication of the liquid smoke pressure, and a solenoid valve 86 is provided to allow remote control cutoff of the liquid smoke flow from the reservoir 80.

In the illustrated embodiment, the liquid smoke line 82 terminates in a flexible hose 82A having a quick-disconnect coupling 87 on its free end. The coupling 87 is adapted to be joined to a mating coupling 88 provided on the machine 10. The coupling in turn connects the liquid smoke hose 82A through conduits 89 to a plurality of atomizing nozzles 90 mounted in the housing 41.

As seen in FIGS. 1 and 2, the machine 10 also includes a pneumatic supply line 92 for directing a supply of air to the nozzles 90 simultaneously with the flow of liquid smoke to the nozzles. In this regard, the line 92 includes a quick-disconnect coupling 93 for connection to a source of air under pressure (not shown). The air supply line 92 also includes high- and low-pressure gauges 94 and 95 to read out the pressure of the air supplied to the nozzles 90, a throttling valve 96 for adjusting the air pressure, and a solenoid valve 97 for remote control of the airflow. A shutoff valve 98 is also provided for complete airflow control.

In accordance with this invention, the machine 10 includes means for creating and maintaining a turbulent cloud of nebulized liquid smoke within the enclosed smoke chamber defined by the housing 41. In the illustrated cheese smoking machine 10, such means comprises a plurality of the nozzles 90 spaced within the housing 41 along the path of travel of the product stream on the conveyor belt 60. Each nozzle 90 is an atomizing nozzle that nebulizes the liquid smoke being fed from the reservoir 80 through the smoke line 82. A suitable form of nozzle 90 is a pneumatic atomizing nozzle presently marketed by Spraying Systems, Inc., of Bellwood, Illinois, under Model Nos. F2C or F1.

The nozzles 90 can be selected so that the liquid smoke droplets discharged from them vary in size up to about 150 microns or so, as long as the liquid smoke is nebulized. The droplet size of course will depend upon such factors as the pressures in the liquid smoke line 82 and the air line 92; the physical dimensions of the housing 41; and the degree of negative pressure created within the housing by the exhaust system 70. Generally, however, the density of the smoke cloud can be controlled by regulating the relative pressures in the air supply line 92 and liquid smoke line 82, by means of the valves 96 and 84, respectively. Thus, for example, a decrease in the pressure in the airline 92 and a relative increase in the liquid smoke line pressure would increase the density of the resulting liquid smoke cloud, and vice versa.

The smokiness imparted to the products, such as the cheese slices 50, will be directly related to the density of the liquid smoke cloud in the housing 41, and the residence time of the product at the smoke station 40, as determined by the length of the housing 41 and the forward speed of the conveyor belt 60. For smoking the cheese slices 50 in the machine 10, it has been found desirable to provide the housing 41 with a length of approximately 4 feet, and to set the speed of the conveyor belt 60 at approximately 40 feet per minute, so that the machine 10 will meet desired production standards. With this arrangement, the residence time for the cheese in the housing 41 and in the liquid smoke cloud is approximately 6 seconds. Of course, these physical parameters can be adjusted to meet changing production standards.

The nebulizing means, such as the nozzles 90, are also arranged to create turbulence within the smoke chamber of the machine 10. By establishing such conditions, the cloud of nebulized smoke is in a state of constant movement and agitation within the housing 41, and the cloud will be circulated into contact with all exposed surfaces of the comestible products passed through the housing. The turbulent conditions in the housing 41 are created in the illustrated embodiment by the pressure of the air and liquid smoke discharging from the atomizing nozzles 90. As shown in FIGS. 1 and 1A, in the preferred embodiment, the turbulence of the nebulized liquid smoke is greatly increased by staggering the nozzles 90 uniformly within the housing 41 along the path of the belt 60. By this arrangement, adjacent nozzles 90 circulate the nebulized liquid smoke in opposite directions around the housing 41, and the resulting liquid smoke cloud will be in a state of constant agitation and movement. The nebulized liquid smoke will hence contact the exposed surfaces of the comestible product uniformly.

As further illustrated in FIGS. 1 and 2, the nozzles 90 in the preferred embodiment are also arranged within the housing 41 with respect to the path of the belt 60 so that the product stream on the belt is subjected to the cloud of liquid smoke as soon as the liquid smoke is nebulized by the nozzles, or just shortly thereafter. This feature is accomplished by placing the nozzles 90 adjacent the belt 60 so that the product stream, such as the cheese slices 50, is subjected to the nebulized discharge of the nozzles, as well as to the circulating, turbulent liquid smoke cloud. With this arrangement, the desired smokey flavor can be imparted to the cheese slices 50 very rapidly, and the machine 10 can be operated to smoke cheese and the like in mass production quantities.

Further, as explained in the above-identified Allen patent, when smoking comestible products, such as cheese, it is beneficial to maintain the product at a lower temperature than the nebulized liquid smoke, so that the liquid smoke is attracted to the product and can condense thereon. As an example, the liquid smoke nebulized by the nozzles can be maintained at about 70° F. and the cheese slice 50 treated at a temperature of about 55° F. This temperature differential is facilitated in the treatment of cheese in the machine 10 by the fact that cheese-processing steps which usually precede the smoking operation lower the temperature of the cheese to about 55° F. Of course, for products other than cheese, the desired temperature differential can be obtained by providing the machine 10 with means to lower the product temperature to slightly below the ambient temperature, or by heating the air or other gas which is mixed with the liquid smoke by the nozzles 90. In fact, if additional moisture in the housing 41 is not an objectionable condition, such as when smoking some types of meats and sausages, the temperature differential between the liquid smoke and the product can be accomplished by directing steam, rather than air, to the nozzles 90.

The machine 10 is further provided with a water supply system for maintaining sanitary conditions during the operation of the machine and for purging accumulated liquid smoke and other debris. In this regard, the machine 10 includes a water inlet pipe 100 adapted for connection to a suitable water source. Control valves 101 and 102 are provided in the line 100 for regulating the water flow, and a quick-disconnect coupling 103 is provided for joining the line 100 to the fixed coupling 88. As seen in FIG. 2A, the coupling 103 permits the water line 100 to be connected to the liquid smoke lines 89, so that the liquid smoke lines and the nozzles 90 can be purged with fresh water after the operation of the machine 10 is completed.

The water supply system also includes means for flushing accumulated liquid smoke condensate and other debris from the belt 60 and for lubricating the belt during the operation of the machine 10. Accordingly, the line 100 is connected to a conduit 104 which leads to water injection nozzles 105 and 106. As illustrated in FIGS. 1 and 2, the nozzle 105 is arranged in the belt channel 24 at the upstream end of the smoke housing 41. The line 104 and nozzle 105 are arranged to supply a constant, regulated flow of water to the underside of the belt 60 to lubricate the belt and flush accumulated liquid smoke condensate and other debris, such as bits of food, etc., away from the belt and from the housing 41. The motion of the belt 60 will carry the water from the nozzle 105 and other debris forwardly in the recess 26 to a pair of drains 107 provided adjacent the belt 60. The drains 107 in the recess 26 then operate to discharge this flushing water from the housing 41. In the same regard, a drain 108 provided in a trough 108A across the channel 24, downstream from the smoke station 40, will collect and discharge the residual flushing water and debris carried from the smoke station 40 by the belt 60. The flow of fluid from the nozzle 106 will facilitate this downstream flushing of the channel 24.

An additional spraying nozzle 110 is connected to the water supply line 100 by a conduit 109. As illustrated in FIGS. 1A and 2A, the nozzle 110 is positioned beneath the return portion of the belt 60 and is adapted to spray cleansing water onto the outer side of the belt 60 and the belt flights 61. The water discharging from the nozzle 110, and the liquid smoke condensate and other residue removed from the belt by the water are collected in the drip pan 28 and are discharged from the drip pan through a drain 29. By this arrangement, the machine 10 is provided with a flushing system which maintains the belt channels 24, the recess 26, and both sides of the conveyor belt 60 in a sanitary condition throughout the operation of the machine 10.

It will be appreciated by those skilled in the art that the conditions for imparting the desired smokey taste to a variety of comestible products cannot be quantitatively measured. Generally, the desirable smokiness has been obtained before the exposed surfaces of the treated product are fully wetted, and before the liquid smoke has created any undesirable streaking, staining or discoloration of the product surfaces.

In treating cheeses with the machine 10, it has been found that a very desirable smokiness is imparted to the cheese when there is a very slight beading of liquid smoke droplets on the treated cheese slices. The degrees of wetness of the product surfaces obtained when the desired smokey taste is reached will vary considerably for various comestible products. The surface wetness will be highest with products such as cheeses; will be lower by a factor of about 2 with meat products generally; will be reduced further by a factor of about 3 for soybean meat substitutes and the like; and will be lowest for thin products with a high surface-to-weight ratio, such as potato chips and the like.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention.

What is claimed is:

1. Apparatus for smoking a quantity of comestible products comprising:
   conveyor means for moving a stream of said products along a predetermined path of travel;
   a first operating station positioned along said path for loading a supply of said product onto said conveyor means to form said product stream;
   a second operating station positioned downstream from said first station along said path for removing said products from said conveyor means;
   a smoking chamber positioned along said path intermediate said first and second stations arranged to receive said conveyor means and temporarily enclose a portion of said product stream;
   means to direct a supply of liquid smoke into said chamber;
   means to nebulize said liquid smoke to form a cloud of liquid smoke within said chamber in the path of said product stream, with the major portion of said cloud being formed from droplets of a size less than about 150 microns;
   means to circulate said cloud to bring said nebulized smoke into substantially uniform contact with the exposed surfaces of said product within said chamber;
   means to create a pressure differential between the interior of said smoking chamber and the surrounding atmosphere to prevent escape of any substantial portion of nebulized liquid smoke cloud from said chamber into the adjacent atmosphere;
   means to flush accumulated liquid smoke condensate from said chamber and said conveyor means;
   means to control the speed of travel of said conveyor means; and
   means to regulate the density of said smoke cloud within said housing;
   whereby a smokey flavor is rapidly imparted to said products by exposure of said product stream to said cloud of liquid smoke of a selected density for a selected time interval.

2. Apparatus for smoking a quantity of comestible products comprising:
   means for moving a stream of said products along a predetermined path of travel;
   enclosure means defining a smoking chamber along said path arranged to temporarily receive a portion of said product stream;
   means to direct a supply of liquid smoke into said chamber;
   means to create a moving cloud of nebulized liquid smoke within said chamber in the path of said product stream;
   means to control the speed of movement on said product stream along said path to thereby control the residence time of said products in said smoking chamber;
   exhaust means operative to create a pressure within said enclosure means lower than the pressure of the surrounding atmosphere so that the resulting negative pressure differential thereby seals said liquid smoke cloud within said enclosure; and
   means to remove liquid smoke condensate from said chamber and said means for moving said product stream;
   whereby a smokey flavor is rapidly imparted to said products by exposure of said product stream to said cloud of nebulized liquid smoke of a selected density for a selected time interval.

3. Apparatus for smoking a quantity of comestible products comprising:
   means for moving a stream of said products along a predetermined path of travel;
   enclosure means defining a smoking chamber along said path arranged to temporarily receive a portion of said product stream;
   means to direct a supply of liquid smoke into said chamber;
   means to create a moving cloud of nebulized liquid smoke within said chamber in the path of said product stream;
   means to control the speed of movement on said product stream along said path to thereby control the residence time of said products in said smoking chamber;
   inlet and outlet ports included in said enclosure for said product stream;
   exhaust means operative to create a negative pressure within said enclosure lower than the pressure of the surrounding atmosphere to thereby create a negative differential pressure substantially sealing said liquid smoke cloud within said enclosure, said exhaust means including means adjacent said ports to withdraw a substantial portion of the air induced into said enclosure through said ports by said negative pressure differential, to reduce the loss of nebulized liquid smoke from said housing; and
   means to remove liquid smoke condensate from said chamber and said means for moving said product stream;
   whereby a smokey flavor is rapidly imparted to said products by exposure of said product stream to said cloud of nebulized liquid smoke of a selected density for a selected time interval.

4. Apparatus for smoking a quantity of comestible products comprising:
   means for moving a stream of said products along a predetermined path of travel;
   enclosure means defining a smoking chamber along said path arranged to temporarily receive a portion of said product stream;
   means to direct a supply of liquid smoke into said chamber;
   means to create a moving cloud of nebulized liquid smoke within said chamber in the path of said product stream;
   means to control the speed of movement on said product stream along said path to thereby control the residence time of said products in said smoking chamber;
   means to create a pressure differential between the interior of said smoking chamber and the surrounding atmosphere to prevent the escape of any portion of nebulized liquid smoke cloud from said chamber into the adjacent atmosphere;
   means provided in said enclosure means to direct condensate away from said product stream received thereby to substantially eliminate the discharge of condensate onto said stream; and
   means to remove liquid smoke condensate from said chamber and said means for moving said product stream;

whereby a smokey flavor is rapidly imparted to said products by exposure of said product stream to said cloud of nebulized liquid smoke of a selected density for a selected time interval.

5. The smoking apparatus in accordance with claim 1 wherein said moving cloud is created by atomizing nozzle means positioned within said enclosure means and directed to circulate said cloud within said enclosure.

6. The smoking apparatus in accordance with claim 5 wherein said atomizing nozzle means is arranged in said enclosure means to subject said product stream to said liquid smoke cloud as the liquid smoke is nebulized by said nozzle means.

7. The smoking apparatus in accordance with claim 5 wherein said nozzle means comprises a plurality of nozzles arranged in a staggered relationship in said enclosure means along said path and directed so that adjacent nozzles discharge in opposed directions and create turbulent conditions within said enclosure.

8. The smoking apparatus in accordance with claim 1 wherein said condensate removal means comprises means to inject a cleaning medium adjacent said means for moving said product stream and drain means downstream from said enclosure means to remove said medium from said apparatus.

9. The smoking apparatus in accordance with claim 8 wherein said means to move said product stream comprises conveyor means positioned for travel within a channel and wherein said injection means is positioned to accumulate said cleaning medium within said channel upstream from said drain means.

* * * * *

UNITED STATES PATENT OFFICE
CERTIFICATE OF CORRECTION

Patent No. 3,643,587          Dated February 22, 1972

Inventor(s) Harrington et al

It is certified that error appears in the above-identified patent and that said Letters Patent are hereby corrected as shown below:

Claim 1, col. 7, line 67, change "housing" to --chamber--;

Claim 3, column 8, line 45, change "housing" to --enclosure--;

Claim 5, column 9, line 7, change "enclosure means" to --chamber--;

Claim 5, colmun 9, line 8, change "enclosure" to --chamber--;

Claim 6, column 9, lines 10-11, change "enclosure means" to --chamber--;

Claim 7, column 9, line 15, change "enclosure means" to --chamber--;

Claim 7, column 10, line 3, change "enclosure" to --chamber--;

Claim 8, column 10, lines 7-8, change "enclosure means" to --chamber--;

Signed and sealed this 19th day of February 1974.

(SEAL)
Attest:

EDWARD M. FLETCHER, JR.          C. MARSHALL DANN
Attesting Officer                 Commissioner of Patents